United States Patent [19]

Erel

[11] Patent Number: 4,508,358

[45] Date of Patent: Apr. 2, 1985

[54] APPARATUS FOR USE AS PHYSICAL EXERCISER AND MEANS OF LOCOMOTION

[76] Inventor: David Erel, Kings B/22, Regent St., Bedford View 2008, South Africa

[21] Appl. No.: 392,254

[22] Filed: Jun. 25, 1982

[30] Foreign Application Priority Data

Jul. 15, 1981 [IL] Israel .................................... 63320

[51] Int. Cl.³ ............................................. B62M 1/12
[52] U.S. Cl. ..................................... 280/234; 272/72; 280/230; 280/233
[58] Field of Search ............... 280/233, 230, 232, 234, 280/221, 224, 226 R, 226 H, 225; 272/72, 73

[56] References Cited

U.S. PATENT DOCUMENTS

| 516,786 | 3/1894 | Clark | 280/234 |
| 1,479,887 | 1/1924 | Bitner | 280/234 |
| 3,760,905 | 9/1973 | Dower | 280/233 |
| 3,895,825 | 7/1975 | Sink | 280/234 |
| 3,979,135 | 9/1976 | Meritzis | 280/226 R |

Primary Examiner—David M. Mitchell
Assistant Examiner—Donn McGiehan
Attorney, Agent, or Firm—Toren, McGeady and Stanger

[57] ABSTRACT

An apparatus which serves as a physical exerciser and as a means of locomotion is built up of a chassis and at least two, but preferably three wheels, one of which is positively driven. The rider occupies a seat and actuates a linearly reciprocable drive member, the motion of which is transmitted to the driven wheel via a link, the linear movement being transformed into rotary movement.

29 Claims, 9 Drawing Figures

APPARATUS FOR USE AS PHYSICAL EXERCISER AND MEANS OF LOCOMOTION

This invention relates to apparatus suitable for use both as a means of locomotion and as an exerciser.

BACKGROUND OF INVENTION

Known means of locomotion such as bicycles require the rider to exercise certain of the muscles of the body. With a bicycle, however, only the leg muscles to a lesser extent the abdominal muscles are principally exercised. It has recently been reported in the media that certain medical practitioners are of the opinion that the most all-round exercise can be obtained when participating in the sport of rowing. A person who is rowing is seated on a slide which is movable towards and away from a position at which the rower's feet are secured. Thus, the legs and arms are exercised when rowing and substantially all parts of the body are accordingly exercised. When rowing, however, large expanses of open water are required.

OBJECT OF THE INVENTION

It is an object of the present invention to provide apparatus which, while serving also as a vehicle, effects healthy exercise of the human body.

SHORT SUMMARY OF DISCLOSURE

According to the invention, a physical exercise apparatus comprises a wheeled vehicle having a chassis, at least one of the wheels being adapted to be positively driven, a seat for a rider on the vehicle, at least one linearly reciprocable drive member on the vehicle and a link for transmitting the linear movement of the drive member to the positively driven wheel while transforming said linear movement to rotatory movement of the driven wheel.

In a preferred form of the invention, the apparatus is in the form of a tricycle having a forward wheel by which the vehicle may be steered and a pair of rearward wheels. It will be understood, however, that alternative arrangements are possible. In a first alternative form, the vehicle may be four-wheeled and provided with a pair of forward steering wheels and a pair of rearward wheels. In a second alternative form, the vehicle may be in the form of a tricycle but be provided with a pair of forward steering wheels and a single rearward wheel.

Both rearward wheels are preferably arranged to be positively driven. However, only one of the rearward wheels may be positively driven, as is the case in the second alternative mentioned in the foregoing paragraph.

The chassis may include as part of its structure upper and lower hollow rails of tubular, rectangular cross-sectional configuration defining a housing for a movable member connected to an endless chain slung about two spaced apart sprockets, each member being movable longitudinally of the rail with which it is associated, means being provided to transmit the linear movement of the members to one or more wheels of the vehicle while transforming said linear movement to rotational movement, via a transmission gear with proper transmission ratio.

Preferably the movable member disposed within the upper rail comprises a handle adapted for manual operation and the member associated with the lower rail includes two movable pedals adapted to be moved by the rider's feet.

The upper rail may be tiltable about its longitudinal axis, gear means being provided for transferring such tilt to the steerable wheel of the vehicle. The said transmission gear is intended to transmit movement of the upper rail to the steering wheel, but it would be within the scope of the invention to employ other, conventional, means. This would especially be the case with the embodiment including two frontal steering wheels in which means different from above mentioned endless chain could serve.

SHORT DESCRIPTION OF DRAWINGS

A presently preferred exemplary embodiment of the invention will now be described by way of illustration only with reference to the accompanying diagrammatic drawings in which.

DESCRIPTION OF PREFERRED EMBODIMENT

Figure 1:
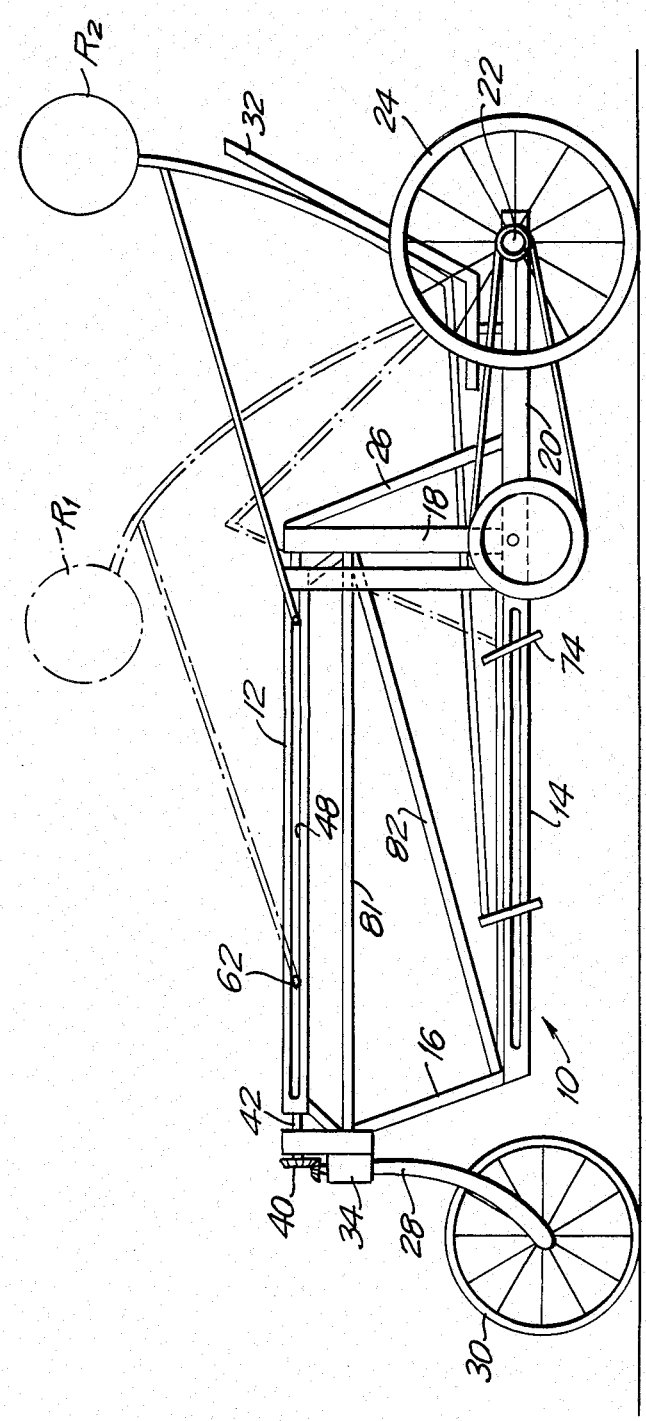
FIG. 1 is a side elevation of physical exercise apparatus according to the invention.

Referring to the drawings, the new physical exercise apparatus comprises a vehicle having a chassis 10 including upper and lower rails 12 and 14 respectively. The upper rail 12 is supported on forward and rearward upright members 16 and 18 respectively. A portion 20 of the lower rail 14 extends rearwardly and both rails 12 and 14 are disposed medially and lie in the plane of the longitudinal axis of the vehicle when seen in plan view.

An axle 22 is provided at or towards the rear end of the rail 14, and wheels 24 are located at each end of the axle 22. The rearward upright support member 18 for rail 12 is secured on the rearwardly extending portion 20 of rail 14 to extend upwardly therefrom. Upright member 18 is buttressed by an obliquely disposed truss 26. Members 81, 82, 26 are provided as stiffening members to the chassis structure. A fork 28 is provided at the forward end of the vehicle and a steerable wheel 30 is secured in the fork 28.

An adjustable seat 32 is provided for the rider, the seat being adjustable longitudinally of the vehicle in order to permit use by people of different body size.

Figure 2:
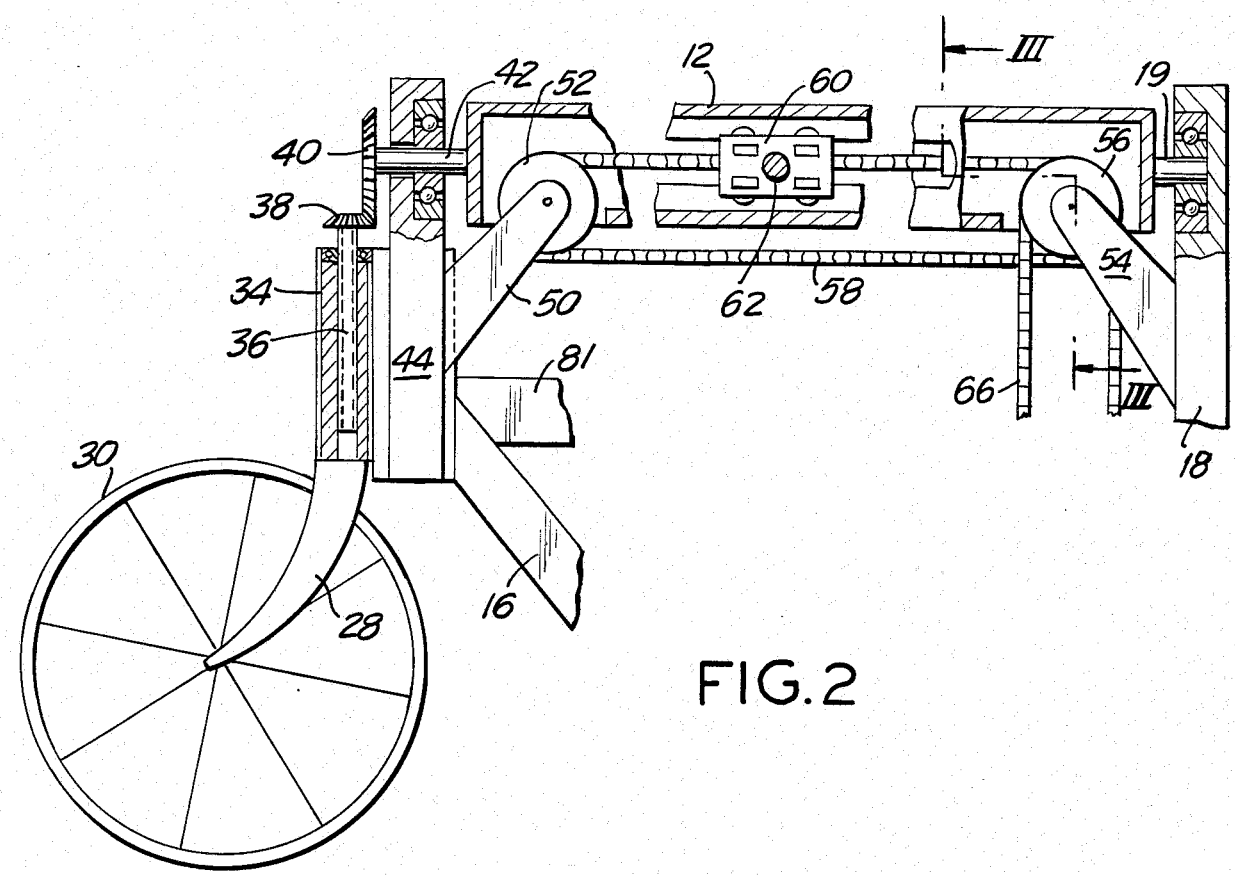
FIG. 2 is a cross-sectional view of a portion of the apparatus of FIG. 1, i.e. a cross-sectional view of the upper rail.
Figure 3:
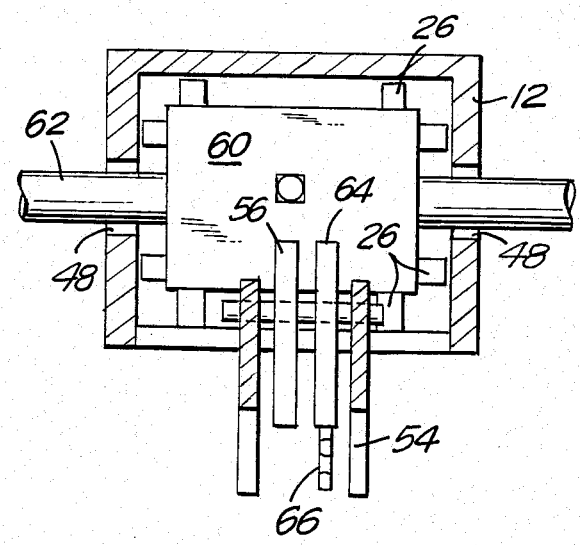
FIG. 3 is a section on the line III—III of FIG. 2.
Figure 4:
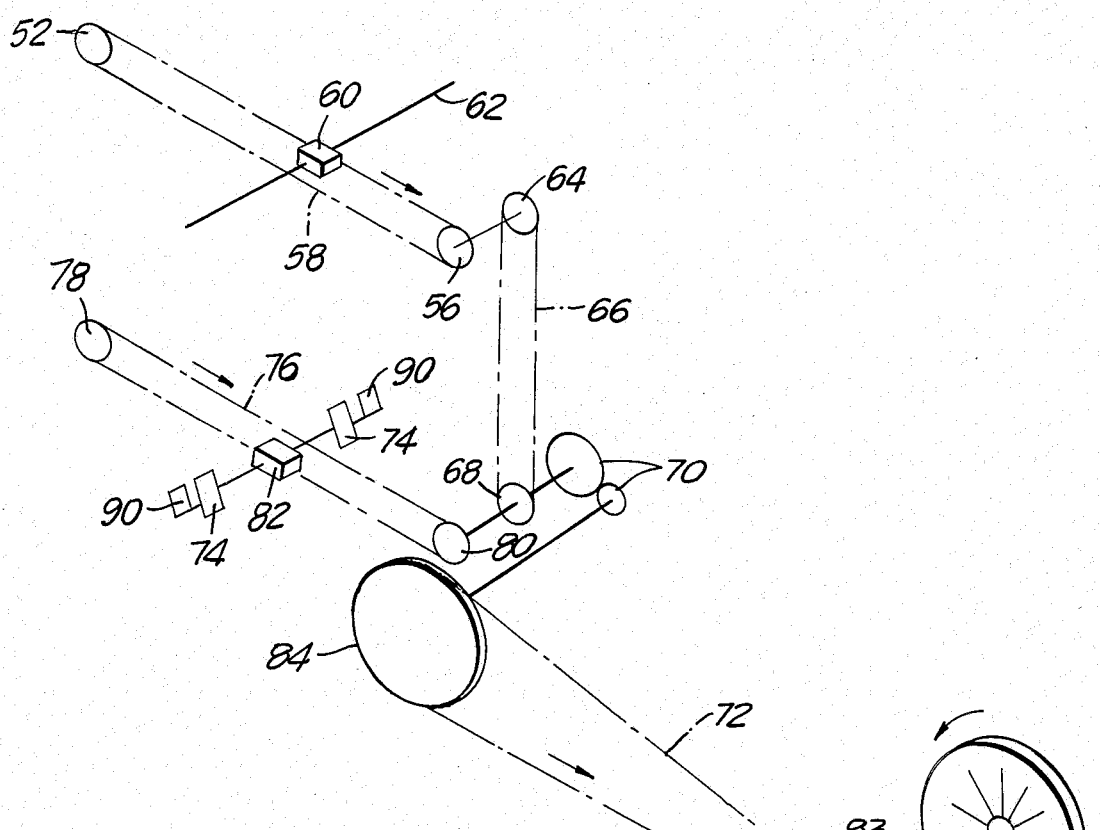
FIG. 4 is a schematic illustration of the transmission means of the apparatus in isometric view.

As shown particularly in FIG. 2, the upper portion of the fork 28 is provided with a sleeve 34 in which is disposed a rod 36 which is equipped with a bevelled gear wheel 38. The gear wheel 38 is associated with a crown wheel 40. An axle 42 is fixed at its one end to the crown wheel 40. The axle 42 is passed through a member 44 and is freely rotatable therein. The end of member 44 remote from the crown wheel 40 is fixed to the chassis 10, via members 81 and 16.

The upper rail 12 is fixed at its forward end to axle 42 and carries a stub shaft 19 at its rearward end which is freely rotatable in an aperture provided in the upper end of the upright member 18.

The upper rail 12 is of tubular rectangular cross-sectional configuration. Elongated slots 48 are provided in the normally vertically disposed sides of the rail 12. An oblique arm 50 extends from member 44 and an idler sprocket 52 is located on the upper end of arm 50. A similar arm 54 extends from upright member 18, which arm 54 carries a driven sprocket 56 at its upper end. An endless chain 58 is slung about the two sprockets 52 and 56. The sprockets and chain are thus housed within the hollow rail 12.

A reciprocably movable block member 60 is connected by a bearing to the upper run of chain 58. The block 60 includes wheels 26 to guide it during travel within the rail 12. Laterally extending handle bars 62 are provided on both sides of block 60.

A second sprocket 64 is keyed on the same axle as sprocket 56. A second chain 66 is slung about sprocket 64 and a sprocket 68. Through the agency of a gear transmission 70 and a relatively large sprocket 84, a chain 72 transmits drive to the wheels 24, via a differential mechanism 83.

Similarly, the drive to the wheels 24 may be accomplished by the rider's feet. For this purpose, a pair of pedals 74 are provided which operate in a similar manner to the handle bars 62.

When the pedal or pedals 74 are urged forwardly by the foot of the rider, an endless chain 76 slung about an idler sprocket 78 and a driven sprocket 80, is actuated. A body 82, equivalent to block 60, is fixed to the chain 76, the block being similarly guided during its travel within the housing provided by rail 14 by suitable wheels (not shown). The driven sprocket 80 is associated via transission gears 70 with the sprocket 84 through which the drive is transmitted to wheels 24.

In operation, a rider indicated generally by the letter R in FIG. 1, is seated on the seat 32. In the starting position shown at R1, the rider bends forward with the arms outstretched and the legs bent, the knees being drawn towards the chest. The rider now pulls the handle bars 62 rearwardly, at the same time extending the legs until, at the end of the stroke, the rider assumes the position shown at R2 in FIG. 1.

With respect to the upper rail 12, reciprocably movable member 60 is thereby moved rearwardly, which movement is transmitted by chain 58. Movement of chain 58 results in rotation of sprockets 52 and 56 which, in turn, results in movement of chain 66 as sprocket 64 is thereby rotated and the drive is transmitted to wheels 24 through sprocket 68, gear transmission 70, and the relatively large sprocket 84 via chain 72 and differential 83, or a sprocket keyed to shaft 22. This latter sprocket could be of gradually, stepwise increasing diameter, which—with an appropriate shifting mechanism—would provide varying transmission ratio.

A similar arrangement is intended to be provided for the lower rail 14. The pedals 74 may either be actuated simultaneously with the handle bars 62 or the handle and pedals may be alternatively or individually operated. The feet of the rider are held in a stirrup (not shown) fixed on the pedal so that the portion of the stirrup opposite the operative face of the pedal can permit the pedal 74 to be withdrawn to the position at the start of the stroke. Applicant envisages a stirrup 86 which is in the form of a half hoop with one side open to permit the foot to be moved sideways off the pedals 74 in order to operate the brakes which will be described in greater detail below.

Movement of chains 58 and 76 in the rails 12 and 14 in one operative direction transmits drive to the wheels 24 while movement of the chains in the reverse direction results in free rotation of the sprockets 56 and 80 so that returning the handle bars 62 and pedals 74 to their position at the start of the stroke requires relatively little effort. This arrangement also permits the vehicle to be driven by one operative chain independently of the other.

In order to steer the vehicle, rail 12 is rotatably turned about its longitudinal axis represented by the co-linear axle 42 and stub shaft 19. Turning rail 12 is also accomplished by exerting the requisite effort on the handle bars 62 in order to change the angular orientation of the rail 12. The crown wheel 40 imparts rotational movement to the bevelled gear wheel 38 and thus to the steerable wheel 30 via shaft 36.

It will be apparent that use of the vehicle according to the invention will permit the muscles in substantially all parts of the body to be exercised and, at the same time, the person using the vehicle will also be able to travel from one place to another.

Figure 5:
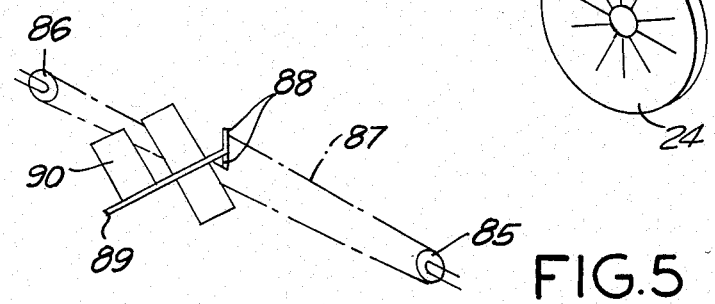
FIG. 5 is a similar illustration to that of FIG. 4 showing the braking mechanism of the vehicle.
Figure 6:
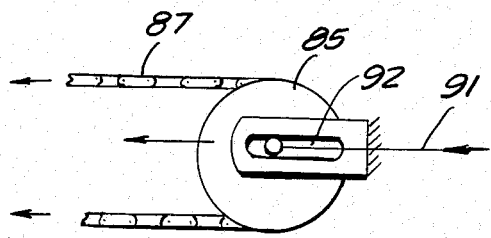
FIG. 6 illustrates a detail of the braking arrangement.

Referring particularly to FIG. 5 of the drawings the braking mechanism is comprised of an endless chain 87 slung over two idler sprockets 85 and 86. The chain is attached to two arms 88 extending from shaft 89. Pedal 90, rigidly mounted on shaft 89, when pressed by the driver's foot rotates causing shaft 89 to rotate, in turn causing arms 88 to move and so pulling the chain 87. The chain pulls the sprockets 85, 86 in the direction shown by arrows. Sprockets 85, 86 can move in slots 92 and 91 their movement is transferred via a steel cable to conventional brakes, either disk brake or brakes as are used in bicycles. A spring will return the sprockets 85, 86 to the original position when the pedal 90 is released.

This braking mechanism can also be hand operated, the pedal being replaced by a lever or handle to transmit the manual movement via the same steel cable to the brakes.

Although the invention has been described and illustrated with reference to a presently preferred embodiment, it will be apparent to those skilled in the art that many variations and modifications are possible without departing from the scope of the appended claims. Thus, return of the handle bars 62 and the pedals 74 to their position at the start of the stroke may be spring-assisted.

Figure 7:
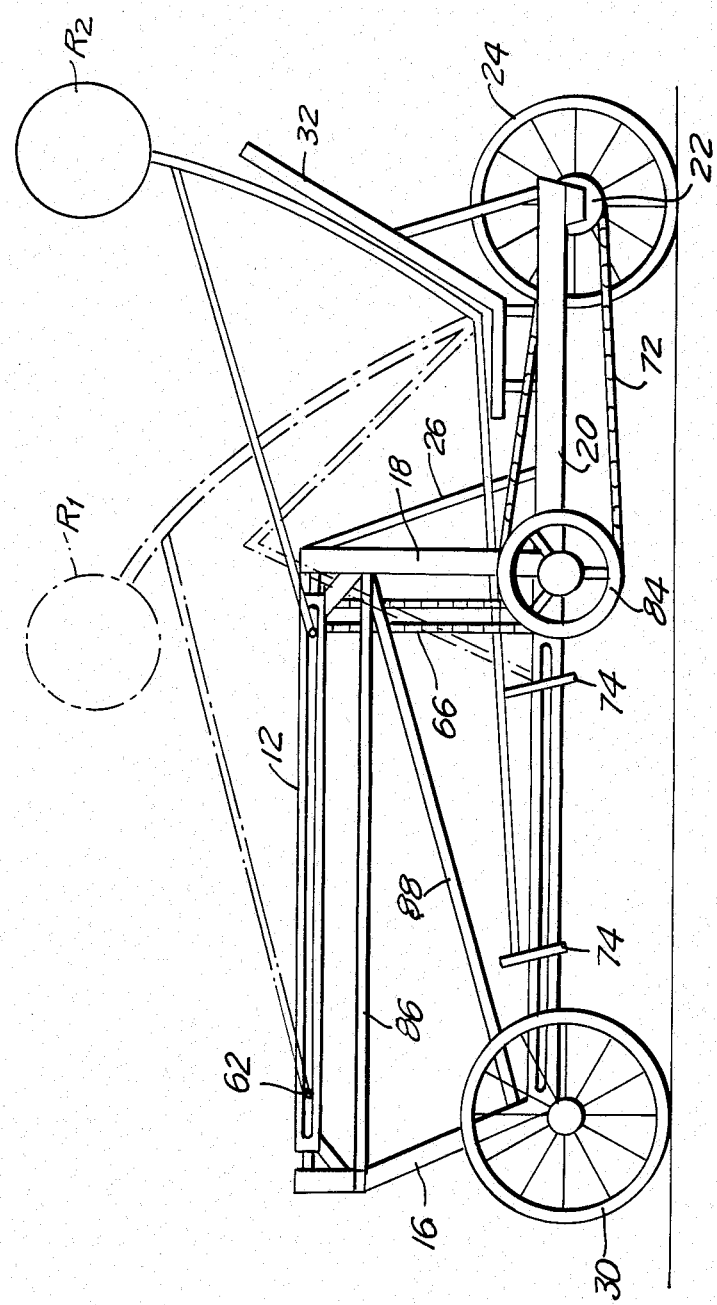
FIG. 7 is a side elevation, similar to FIG. 1, of the physical exercise apparatus with two front wheels and one rear wheel.
Figure 8:
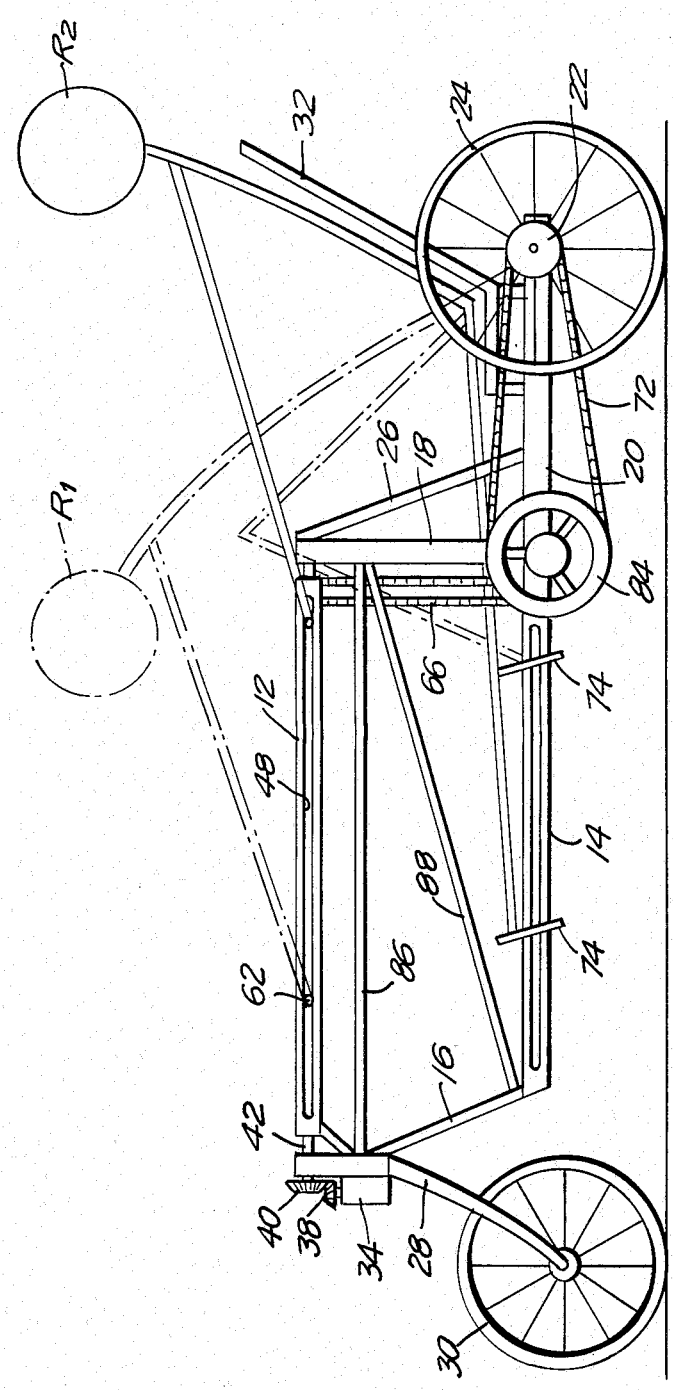
FIG. 8 is a side elevation, similar to FIG. 7, of the physical exercise apparatus with one front wheel and two rear wheels.
Figure 9:
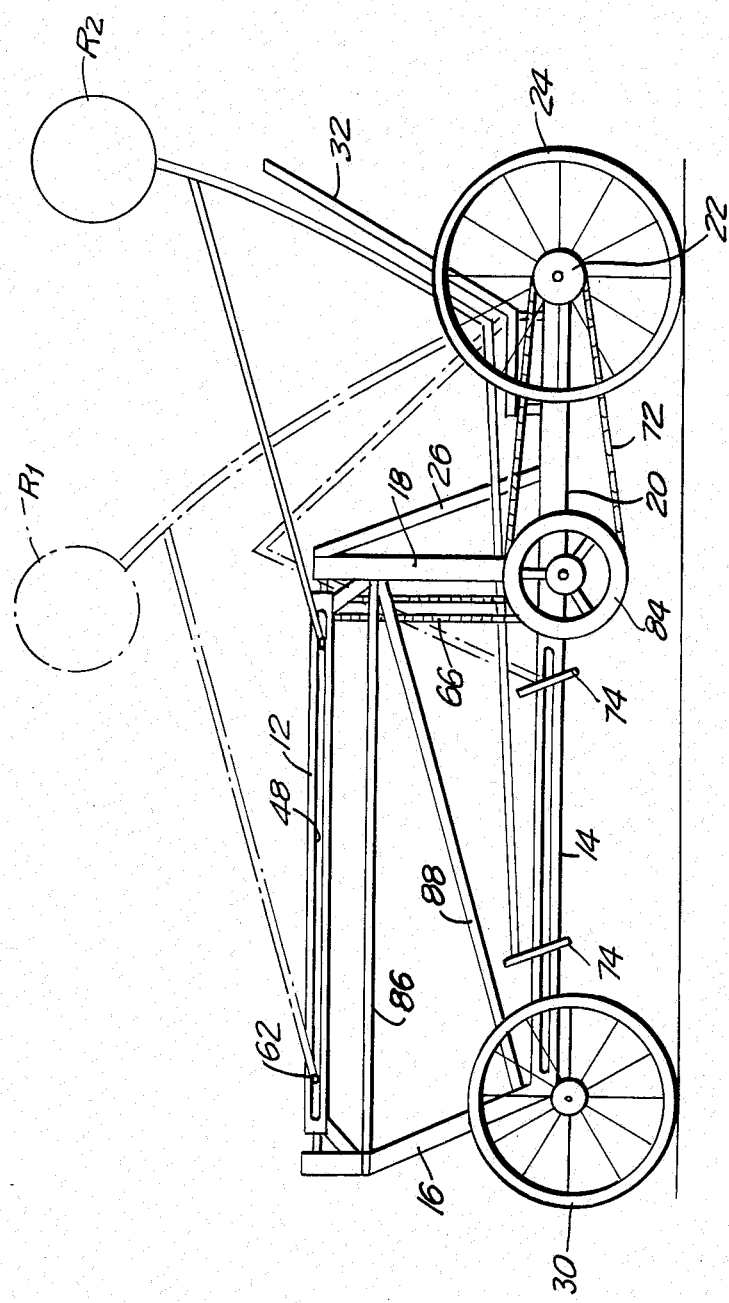
FIG. 9 is a side elevation, similar to FIGS. 1 and 8 of the physical exercise apparatus with two front and two rear wheels.

As already mentioned there are various possibilities of building the vehicle. In the case of a bicycle the vehicle will have one front steering wheel and one rearward driving wheel, while driving will depend on the driver's skill to maintain balance. In the version of three and four wheels both with two front steering wheels, the front steering mechanism will practically be the same as used in motor cars. In FIG. 7 the vehicle has two front wheels and one rear wheel, while in FIG. 8 the wheel arrangement is reversed with one front wheel and two rear wheels. A four wheel vehicle is illustrated in FIG. 9 with two front and two rear wheels. In FIGS. 7, 8 and 9 the same reference numerals are employed as in FIGS. 1 to 6. In this case the tilting movement brought about manually and transferred via member 12 could be transferred via a different mechanism than that described.

I claim:

1. Physical exercise apparatus comprising a plural wheel vehicle having a chassis, at least one of the wheels being adapted to be positively driven, a stationary seat for a rider on the vehicle, two linearly reciprocable drive members on the vehicle forward of said seats, a link for transmitting the linear movement of each said drive member to the driven wheel while transforming said linear movement to rotatory movement of the driven wheel, and each of said linearly reciprocable drive members is provided at a different level on the vehicle.

2. The apparatus of claim 1 in which the vehicle is in the form of a tricycle having a forward wheel by which the vehicle may be steered and a pair of rearward wheels.

3. The apparatus of claim 1 in which the vehicle is four-wheeled and is provided with a pair of forward steerable wheels and a pair of rearward wheels.

4. The apparatus of claim 1 in which the vehicle is in the form of a tricycle provided with a pair of forward steerable wheels and a single rearward wheel.

5. The apparatus of claim 4 in which one of the rearward wheels is arranged to be positively driven.

6. The apparatus of claim 4 in which both rearward wheels are arranged to be positively driven.

7. The apparatus of claim 1 in which the chassis includes an upper rail and a lower rail of suitable cross-sectional configuration each defining a firm guidance, an endless chain slung about two spaced apart sprockets mounted at the ends of said rails, a movable member connected to said endless chain, said member being movable longitudinally with respect to one of the rails, means for transmitting the linear movement of the movable member to at least one of the wheels of the vehicle while transforming said linear movement to rotational movement of the driven wheel.

8. The apparatus of claim 7 in which the movable member disposed within the upper rail is provided with a transversely extending handle adapted for manual operation and the movable member associated with the lower rail is provided with pedals adapted for reciprocable linear movement through the agency of the rider's feet.

9. The apparatus of claim 7 or 8 including at least one steerable wheel, the upper rail is tiltable about its longitudinal axis, mechanical means being provided for transferring such tilt to the at least one steerable wheel of the vehicle.

10. The apparatus of claims 7 or 8 in which the movable member disposed within the upper rail is connected to the chain through a bearing link to permit tilting of the movable member without affecting the orientation of the chain.

11. Physical exercise apparatus, as set forth in claim 1, wherein said two elongated rails comprise first rails, second rails mounted on said support member in a fixed manner below said first rails, a linear reciprocal drive member mounted on said second rails and being linearly reciprocal thereof, means connecting said drive member on said second rails to at least one of the wheels of said vehicle for transforming the linear movement of said drive member on said second rails into the rotational movement of said wheel, and pedals attached to said drive member on said second rails for moving said drive member in the linear reciprocating direction on said second rail, using the rider's leg power.

12. Physical exercise apparatus, as set forth in claim 11, including means for combining the linear reciprocating movement of said drive member associated with said first rails and said drive members associated with said second rail so that the movement of said drive members can be transferred to at least certain wheels of said vehicle and at the same time said drive members can be operated independently of one another.

13. Physical exercise apparatus, as set forth in claim 11, wherein means for interrelating the linear reciprocating movements of said drive member associated with said first rails and said drive member associated with said second rail forcing said drive member associated with said second rail to move when the said drive member associated with said first rail is moved for use in forcibly displacing the legs of the rider while driving the apparatus.

14. Physical exercise apparatus, as set forth in claim 11, wherein said seat is located approximately at the level of said second rail, said being stationary seat includes a fixed back support against which the rider can rest his back.

15. Physical exercise apparatus, as set forth in claim 11, including braking means located on said support member adjacent said second rail for effecting braking of said vehicle, with pedals at any position along the rails without removing the feet from the pedals.

16. Physical exercise apparatus capable of being driven while steered and of being braked while steered comprising a plural wheel vehicle including a support member having a seat thereon for a rider of the vehicle, a linearly reciprocal drive member mounted on said support member, two transversely extending handle bars cantilevered outwardly from and extending transversely of the linear reciprocal direction of said drive member, said support member including at least two elongated rails extending in the linear reciprocal direction for supporting and guiding said drive member in the linear reciprocal direction, said rails mounted on said support member at a height corresponding approximately to the driver's shoulders, said rails being in parallel relation, and a bearing supporting each of the opposite ends of said rails and said rails being rotatable supported in said bearings for rotating about an axis extending through and between said bearings.

17. Physical exercise apparatus, as set forth in claim 16, said handle bars being arranged to be tilted by the rider's hands and, in turn, to tilt said rails, and a steering mechanism for at least one of said wheels via a mechanical linkage interconnecting said guide rails and said steering mechanism for steering said vehicle.

18. Physical exercise apparatus, as set forth in claim 17, including a pair of sprockets spaced apart in the linear reciprocal direction, a chain trained around said sprockets, said drive member connected to said chain, said sprockets being rotatable in both directions, and said drive member being arranged to move freely along the full length of said rails.

19. Physical exercise apparatus, as set forth in claim 18, wherein said vehicle having a forward end and a rearward end, said drive member being movable in the direction toward the forward end and toward the rearward end, and said sprocket closer to the rear end of said vehicle being capable of free rotation without the transmission of movement when said drive member moves in the forward direction.

20. Physical exercise apparatus, as set forth in claim 19, including a bearing for connecting said drive member to said chain for enabling the tilting of said drive member without affecting the orientation of said chain.

21. Physical exercise apparatus, as set forth in claim 16, wherein said handle bars can be pushed and pulled in the linear reciprocal direction and can independently be tilted perpendicularly to the linear reciprocal direction at the same time, where both movements does not affect each other.

22. Physical exercise apparatus, as set forth in claim 16, including braking means located on said support member adjacent said elongated rail and associated with said handle bars so that the braking of said vehicle can be effected by the rider while holding said handle bars, at any position of the handle along the rails.

23. Physical exercise apparatus, as set forth in claim 16, wherein said vehicle having a front end and a rear end with one of said wheels at the front end being arranged for steering said vehicle and one of said wheels being located at the rear end for driving said vehicle.

24. Physical exercise apparatus, as set forth in claim 23, including providing two said steering wheels at the front end of said vehicle and one said driving wheel at the rear end of said vehicle.

25. Physical exercise apparatus, as set forth in claim 16, wherein said vehicle having a front end and a rear end one wheel located at the front end of said vehicle for steering said vehicle and two wheels located at the rear end of said vehicle with at least one of said wheels at the rear end of said vehicle arranged to be positively driven.

26. Physical exercise apparatus, as set forth in claim 16, wherein said vehicle having a front end and rear end, two wheels being located at the front end of said vehicle and arranged to be steered and two wheels located at the rear end of said vehicle with at least one of said wheels at the rear end of said vehicle being arranged to be driven.

27. Physical exercise apparatus, as set forth in claim 16, wherein said vehicle having a front end and a rear end, two said wheels located at the front end of said vehicle and arranged to be steered, and at least one wheel located at the rear end of said vehicle, and said wheels at the front end of said vehicle arranged to be driven.

28. Physical exercise apparatus, as set forth in claim 11, including a pair of sprockets spaced apart mounted at both ends of the rails in the linear reciprocal direction, a chain trained around said sprockets, said drive member connected to said chain, said sprockets being rotatable in both directions, and said drive member being arranged to move freely along the full length of said rails.

29. Physical exercise apparatus, as set forth in claim 28, wherein said vehicle having a forward end away from the rider and a rearward end nearer the rider, said drive member being movable in the direction toward the forward end and toward the rearward end, and said sprocket closer to the rear end of said vehicle being capable of free rotation without the transmitting of movement when said drive member moves in the rearward direction.

* * * * *